US007117021B2

(12) United States Patent
Shearer et al.

(10) Patent No.: US 7,117,021 B2
(45) Date of Patent: Oct. 3, 2006

(54) BLUETOOTH CASSETTE-LIKE DEVICE FOR A HANDS-FREE CELL-PHONE KIT

(75) Inventors: Edwin H. S. Shearer, Pleasanton, CA (US); Kathryn E. Dienst, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/150,253

(22) Filed: May 15, 2002

(65) Prior Publication Data

US 2003/0224726 A1 Dec. 4, 2003

(51) Int. Cl.
*H04M 1/00* (2006.01)

(52) U.S. Cl. ................................ 455/569.2; 455/569.1; 455/41.1; 455/41.2; 455/41.3; 455/556.1; 455/557; 455/575.9

(58) Field of Classification Search ................ 455/41.1, 455/41.2, 41.3, 556.1, 557, 569.1, 569.2, 455/575.9
See application file for complete search history.

(56) References Cited

U.S. PATENT DOCUMENTS 5,781,850 A * 7/1998 Ugge' et al. ................ 455/149
6,058,319 A * 5/2000 Sadler ..................... 455/569.2
6,101,403 A * 8/2000 Masuda .................. 455/569.2

FOREIGN PATENT DOCUMENTS

JP 2001148728 A * 5/2001

OTHER PUBLICATIONS

Jesus A.G. Pulido, "Hands–Free Profile", Bluetooth Special Interest Group, dated Oct. 22, 2001, jesus.pulido@ine.ericsson.se.

* cited by examiner

*Primary Examiner*—Vivian Chin
*Assistant Examiner*—Minh Dao
(74) *Attorney, Agent, or Firm*—Kevin H. Fortin

(57) ABSTRACT

A hands-free kit for cell-phones combines the wireless capabilities of Bluetooth and the sound and visual functionalities of a tape player. A device that has a shape of a conventional magnetic cassette comprises a Bluetooth module. The module automatically detects a data communication initiated with the portable apparatus over a wireless network when the device is inserted in the tape player. Then the module automatically configures the apparatus to transmit to the device a low frequency signal representative of the communicated data. The device converts the received low frequency signal into a magnetic signal further communicated to the tape player for play out and/or display. Thus, when a cell-phone rings, a driver inserts the device in his tape player and the cell is picked up and the conversation played out loud on the loud speakers in the car.

12 Claims, 2 Drawing Sheets

310
330
400
300
320
10
210
200
100
110
20
120
130

BLUETOOTH CASSETTE-LIKE DEVICE FOR A HANDS-FREE CELL-PHONE KIT

REFERENCE TO CROSS RELATED APPLICATIONS

Reference is made to copending application, Ser. No. 10/507,776, filed May 15, 2002 for "Bluetooth control device for mobile communication apparatus", for the same assignee and same inventors, herein incorporated by reference.

FIELD OF THE INVENTION

The invention relates to a device for insertion into a tape player. The invention pertains in particular to Bluetooth-enabled hands-free cell-phone kits that make efficient use of sound systems readily available to users. The invention more specifically pertains to a Bluetooth enabled cassette-type device.

BACKGROUND ART

Cellular phones have gained wide acceptance among users and communicating over cell-phones outside the home and the office environments has created new needs. For example, the use of cell-phones in cars has raised several concerns such as security, convenience of use, sound quality and the like. Indeed, answering a phone call while driving has been proven to be distractive and drivers often loose their attention to the road, the traffic and to their surrounding. A driver may also find it unpractical to hold the cell-phone close to his ear when his hands are already busy steering the wheel or changing gears. In addition, the surrounding noise may disturb the user who may not hear well and/or may not be heard well. The resulting sound quality is poor and cars are thus not well suited for phone conversations.

Several solutions have been released on the market to free the user from holding the cell-phone so that some of the issues mentioned above can be solved. Hands-free kits for cell-phones are widely available and some common ones comprise a microphone and a speakerphone connected to the phone. The microphone and the speakerphone may be integrated into one system that the user can place on his ear and/or head or, alternately, both may be mounted on the interior of the car close to the driver. These hands-free kits permit to partially free the user from having to hold the phone on one hand and they permit to improve the sound quality on the other hand. Other kits may comprise a microphone and a dummy tape connected to the phone. During a phone conversation, the driver inserts the tape in his car tape player and the voice conversation may be rendered through the audio system coupled to the tape player, e.g. speakerphones at the front and back of the car. Since tape players are present in most cars, such hand-free kits may be used with any cell-phone and these kits make great use of the existing audio systems of the car. However such hands-free kits often need to be physically connected to the cell-phone and may not be so convenient if the driver needs to connect the kit to the cell-phone before answering a phone call or if the driver needs to manipulate various buttons before being able to take an incoming call.

U.S. Pat. No. 5,781,850, herein incorporated by reference, proposes a live voice device adapted to utilize in its operation the acoustic loudspeakers already existing in vehicles and connected to a radio receiver apparatus thereof. This document discloses a dummy cassette comprising electronic means adapted to handle the low frequency signals of a cellular telephone apparatus, a microphone, a magnetic transducer facing the reading head of a tape player of the radio receiver apparatus. A suitably sized cord connects the dummy cassette to the cellular telephone apparatus. However, the document discloses that this cord, which is intended for transmission of signals, can also be implemented by radio waves. In a disclosed embodiment, a mini transmitter could be housed in an extension coupled to the cellular telephone apparatus connector. The mini transmitter is tuned on a given frequency pre-set in the car radio receiver so that, when a telephone call is received, it is sufficient to press the corresponding tuning button for receiving the telephone call in live voice from the loudspeaker system of the car radio receiver.

A Bluetooth special interest group was formed to define and promote the Bluetooth technology. This group consists of employees of companies involved in Bluetooth who define together some of the technical requirements for Bluetooth products to ensure interoperability among products. Reference is made to one of the specification being drafted and reviewed by the Bluetooth SIG Car Profile Working Group, "Hands-Free Profile", Oct. 22, 2002 by Jesus A G. Pulido, herein incorporated by reference. This draft seeks to define the protocols and procedures that shall be used by devices implementing the usage model of operating a phone via an in-car device. This working group is interested in all implementations of the hands-free profile that enable a car's embedded hands-free unit to be wirelessly connected to a cellular phone for the purposes of acting as the cellular phone's audio input and output mechanism, providing full duplex audio with possibly noise suppression, voice recognition and so on.

SUMMARY OF THE INVENTION

The solution of the dummy cassette disclosed in U.S. Pat. No. 5,781,850 requires the user to connect the phone to an adapter in order to have the system capable of wirelessly forwarding the voice conversation to the loudspeaker associated with the tape player. Such a solution requires extra manipulation and extra hardware to function correctly and a user who would forget to set up his phone beforehand, i.e. connect the adapter to the phone or tune the radio receiver on the proper frequency, would not be able to take a phone call in time using this solution. In addition, such solution still requires substantial action by the user to forward a phone conversation from the cell-phone to the loudspeaker coupled to the tape player. U.S. Pat. No. 5,781,850 does not disclose any automatic recognition of the dummy cassette and the cell-phone that would enable automatic forwarding of calls from the phone to the loudspeakers.

It is an object of the invention to provide a more convenient solution to enable hands-free phone conversation advantageously using both the functionalities of existing tape players and the wireless capabilities of Bluetooth.

It is an object of the invention to provide a device for enhancing the security of users making phone calls while on the road.

It is another object of the invention to provide a simple solution requiring minimal involvement of the user and thus simplifying the use of cell-phones in cars.

It is yet another object of the invention to efficiently use sound systems coupled to tape players.

To this end, a device of the invention is Bluetooth-enabled. The device comprises a Bluetooth module configured to automatically detect a presence of a Bluetooth-enabled apparatus in a receiving range of the device. Such an apparatus may be a Bluetooth-enabled cell-phone. The Bluetooth module is further configured to automatically detect a data communication initiated with the portable apparatus over a wireless network when the device is inserted in the tape player. The Bluetooth module is also configured to automatically configure the portable Bluetooth-enabled apparatus to transmit to the device a low frequency signal representative of the communicated data. The Bluetooth module is further configured to receive a low frequency signal. The device also comprises a circuit arrangement for converting the received low frequency signal into a magnetic signal; and a transducer for communicating the magnetic signal to the tape player.

In the invention, a data communication carried with the apparatus will be partly or fully forwarded to the device when the device is inserted in the tape player. In the invention, data communication indicates any type of data transmission involving the apparatus and such data may be textual, audio or video. In an embodiment, the apparatus is a Bluetooth-enabled cell-phone and an incoming call received on a Bluetooth enabled cell-phone is forwarded to the device inserted in the tape player. Thus, when the Bluetooth cell-phone rings, the user does not have to look for it any longer. In order to answer the call, the user inserts the device into the tape player and the Bluetooth module automatically controls the cell-phone to accept the incoming call. The voice conversation is then forwarded to the device for play out by a sound system associated with the tape player. However the user still has the possibility of using the device and the user may still accept a phone call by pressing an acceptance button on the cell-phone itself. Bluetooth technology permits to delegate tasks to other devices having greater capabilities for the performance of specific functions than the device itself. In the invention, a phone call is not made through the cell-phone only and advantage is taken from other devices having greater audio capabilities than the cell-phone. The invention also minimizes the manipulation of devices and buttons that is required to take a phone-call and thereby the invention permits to minimize the user's disturbance.

BRIEF DESCRIPTION OF THE DRAWING

The invention is explained in further details, by way of examples, and with reference to the accompanying drawing wherein.

Elements within the drawing having similar or corresponding features are identified by like reference numerals.

DETAILED DESCRIPTION

Figure 1:
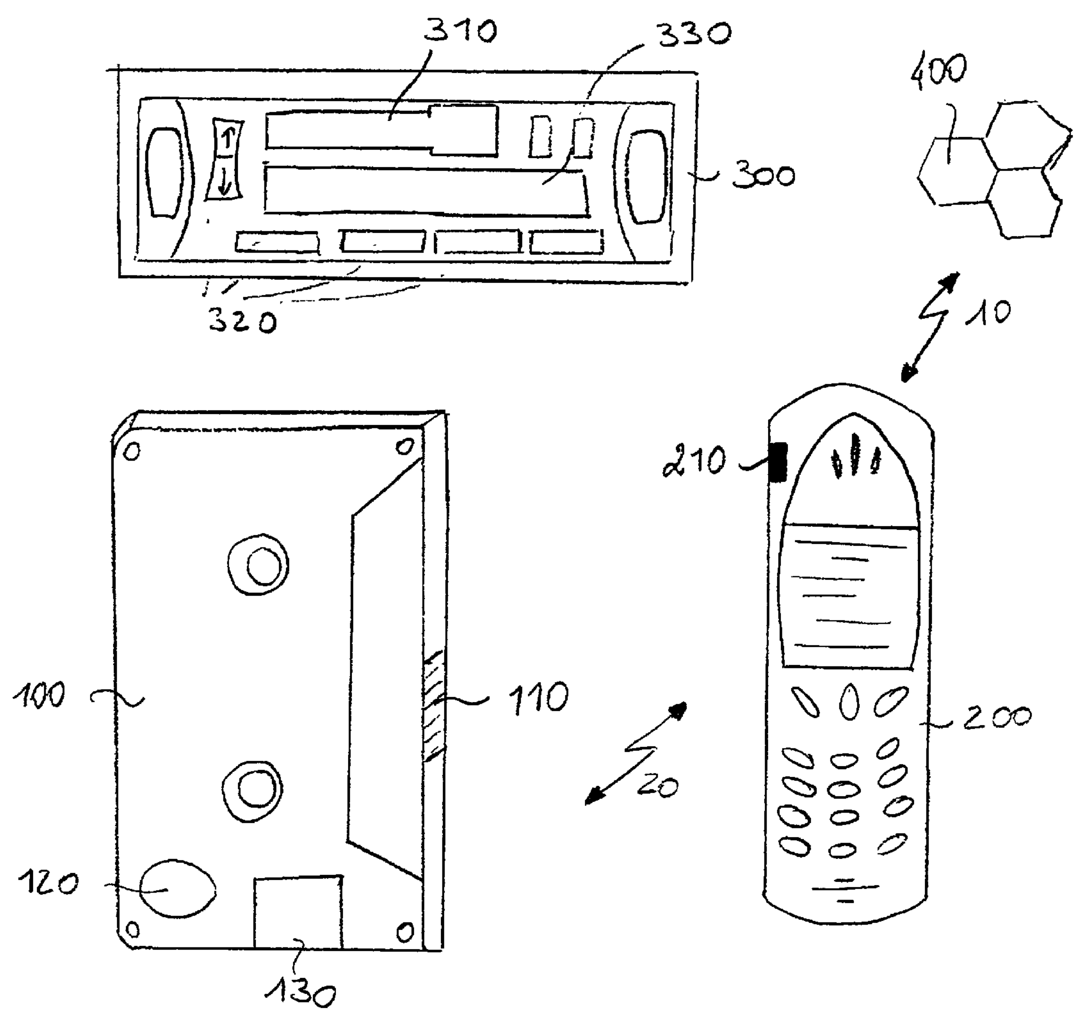
FIG. 1 is a device of the invention.
Figure 2:
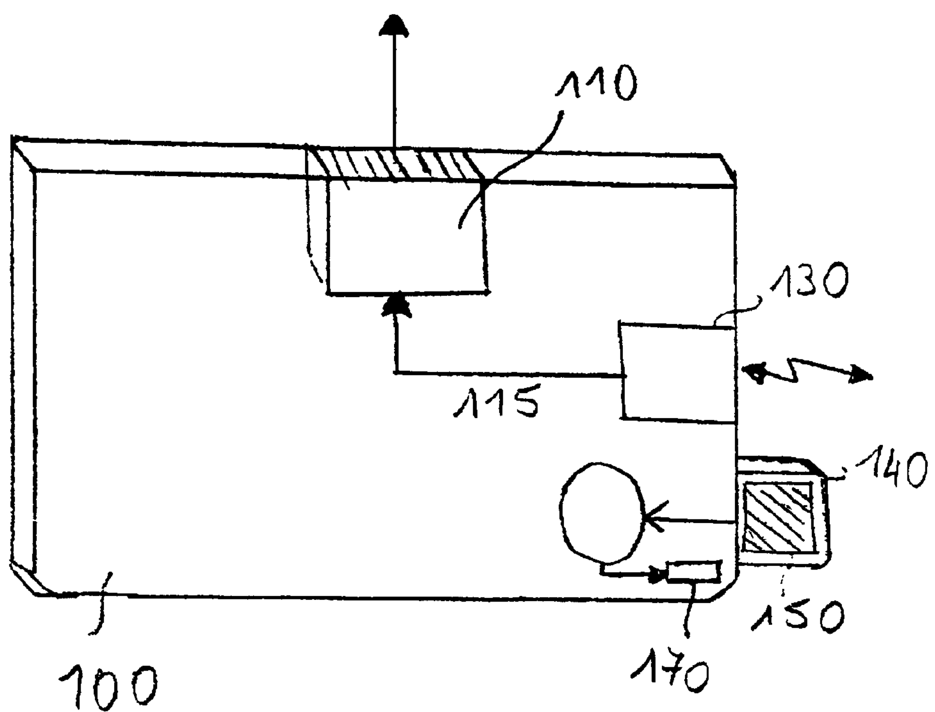
FIG. 2 is another embodiment of a device of the invention having a solar-rechargeable power source; and, FIG. 3 is another embodiment of a device of the invention having a cigarette-lighter power source.
Figure 3:
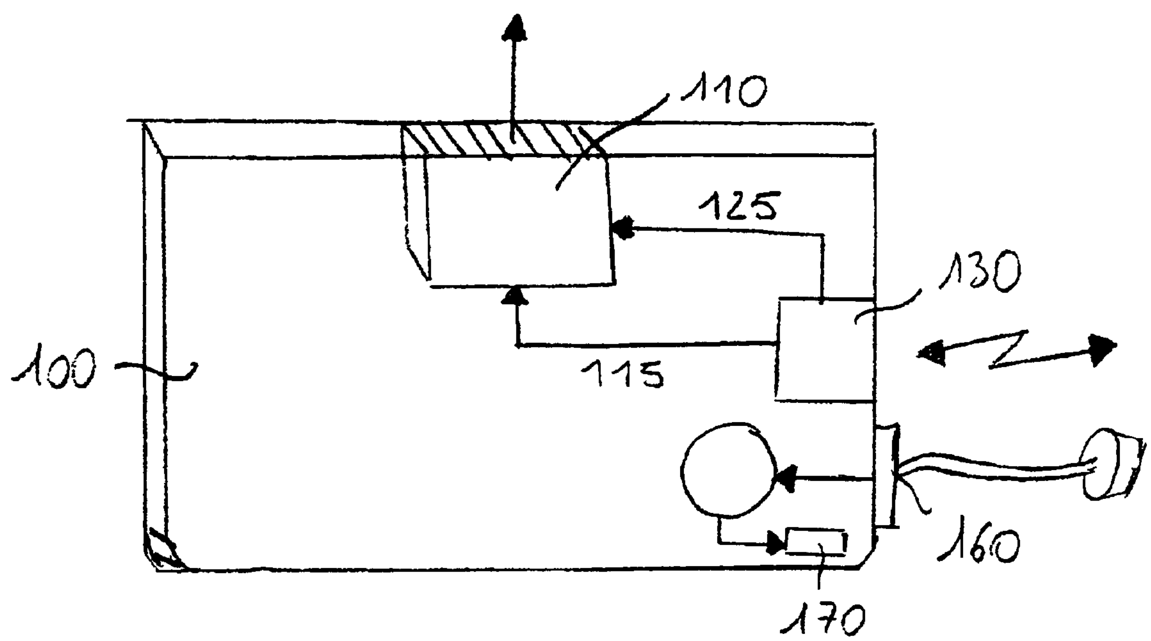

FIG. 1 shows a system comprising a device 100 of the invention, an apparatus 200 and a car stereo 300 comprising a tape player 310. The apparatus 200 may communicate text, audio or data signals over a wireless network 400. In this embodiment, the apparatus 200 is a cell-phone and the network 400 is a cellular wireless network 400 based on one of the various standardized wireless communication protocols such as the UMTS, GSM or CDMA standards. Electronics and modules of the cell-phone 200 enabling communicating over the wireless cellular network 400 are not shown here. The cell-phone 200 comprises a Bluetooth chip 210 enabling the cell-phone 200 to communicate with another Bluetooth-enabled device when in the receiving range of the other device. The protocol used for the communication of audio and data signals between the cell-phone 200 and another Bluetooth device is specified in the Bluetooth specification and in the draft of October 2002, "Hands-Free Profile" of the Bluetooth SIG Car Profile Working Group as mentioned in a previous paragraph.

The car stereo 300 comprises a control interface 320 with various control buttons, a display 330 and a tape player 310. The tape player 310 is a conventional tape player comprising a cassette-slot where a magnetic tape may be inserted and the tape player 310 also comprises internal mechanisms and electronics for rendering or play out of data stored on a magnetic tape or for recording of data onto the magnetic band of the tape player. The internal mechanisms and electronics of the tape player 310 are not shown in FIG. 1. In this embodiment, the car stereo is coupled to a sound system such as a set of loudspeakers.

In this embodiment, the device 100 of the invention has a shape of a conventional magnetic tape. The device 100 is designed to be inserted in future or available conventional tape players such as the tape player 310 of the car stereo 300. Like the cell-phone 200, the device 100 comprises a Bluetooth module 130 for communicating over a Bluetooth network. The device 100 further comprises a transducer 110 configured to convert a low frequency signal 20 received by the Bluetooth module 130 over the Bluetooth network into a magnetic signal for rendering by the stereo 300 or another device coupled to the stereo 300, e.g. the sound system as will be shown hereinafter.

In the invention, a user may accept a call 10 received on the cell-phone 200 by inserting the device 100 in the tape player 310. When the phone 200 notifies the user that the call 10 is received, e.g. by ringing or vibrating, the user inserts the device 100 in the tape player 310. The device 100 comprises a detection module 135 that detects the insertion of the device 100 in the tape player 310. In this embodiment, the module 135 is a mechanical trigger that gets depressed when the device 100 is inserted in the player 310. In another embodiment of the invention, the detection module 135 is an electronic arrangement that gets connected to the car stereo 300 when the device 100 is inserted in the tape player 310. It is to be noted that the invention encompasses any detection module configured to mechanically or electronically detect the insertion of the device 100 in a tape player. Upon detection, the module 135 informs and configures the Bluetooth module 130 to enable to take the incoming call 10 on the cell-phone 200. The module 130 may transmit a configuration signal to the chip 210 to control the cell-phone 200 to accept the incoming call 10. From there, the voice data associated with the call will be forwarded from the cell-phone 200 to the device 100 for play out by the car stereo 300. To this end, the Bluetooth module 210 communicates a low frequency Bluetooth data signal 20 representative of the voice data received by the phone 200. The Bluetooth chip 210 converts the radio frequency signal 10 into the low frequency signal 20 and communicates the signal 20 to the Bluetooth module 130. The cell-phone 200 and the device 100 may have reciprocally identified each other and have exchanged protocol information upon detection of each other in their respective receiving range. Such identification allows both devices to interoperate using the Bluetooth protocol. Alternately both devices 100 and 200 may carry out such identification and probe/quest exchange upon insertion of the device 100 in the tape player 310.

The module 130 thereafter transmits the received Bluetooth data signal 20 to the transceiver 110. The transceiver 110 is configured to convert a signal 30 received from the module 130 into a magnetic signal 40. The magnetic signal 40 may be a magnetic field modulated by the voice data signal 30 representative of the original live voice data received by the cell-phone 200. The tape player 310 is equipped with a magnetic head, not shown here, for reading conventional magnetic tapes. The transceiver 110 is embedded in the device 100 to face the magnetic head of the tape player 310 and the transceiver 110 communicates the magnetic signal 40 to the magnetic head for play out by loudspeakers of the car stereo 300. Thus, a device 100 of the invention enables to automatically render the live voice data through the sound system associated with the tape player 310 when the device 100 is inserted in the tape player 310. Such a device 100 of the invention provides an advantageous alternative to the poor sound quality of cell-phones when used in cars.

It must be appreciated that the automatic transfer of data other than voice data from the Bluetooth chip 210 to the Bluetooth module 120 is also encompassed in the invention. Indeed, the chip 210 may be configured to forward to the device 100 data representative of voice mails, songs, emails and the like. For example, when a new voice mail is detected on the mailbox of the phone 200, e.g. the cell-phone 200 just entered the wireless service zone of the network 400, the Bluetooth chip 120 may automatically forward this voice mail to the device 100 upon insertion of the device 100 in the tape player 310 or upon detection of the new voice mail if the device 100 had been previously inserted in the tape player 310.

In another embodiment of the invention, the phone 200 may transmit other data to the device 100 in addition to the audio data representative of the live voice conversation. The Bluetooth chip 210 may be configured to transmit identification data to the Bluetooth module 120 representative of the identity of the caller or addresser of the data signal 10 received on the cell-phone 200. For example, a phone number or a name of the person calling or the name or phone number of the person who left the new voice mail may be transmitted to the device 100 for display by the car stereo 300 onto display 330.

In yet another embodiment of the invention, the apparatus 200 may be a laptop with wireless connection to the network 400. The module 120 may be configured to control the Bluetooth chip 210 to forward any data signal received by the apparatus 200 over the wireless network. For example, when the apparatus 200 receives an email over the network 400, the chip 210 may automatically forward data representative of the email to the module 120 for rendering by the car stereo 300. Such representative data may be audio data for rendering by the loudspeakers associated with the car stereo 300 or text data to be displayed onto display 330 as mentioned previously. The apparatus 200 may comprise a Text-to-Speech application that generates an audio file representative of the email and this audio file is further converted into a Bluetooth signal for transmission by the chip 210 to the module 120.

FIG. 4 and FIG. 5 show possible embodiment of the device 100 with different power sources. The device 100 comprises a rechargeable battery 120. In the embodiment of FIG. 4, the battery 120 is solar-powered by way of a solar cell 150 mounted on a retractable tray 140. Thus, advantage is taken of the fact that the device 100 would be left in the car while not in used. In this embodiment, the tray 140 is placed on the outer face of the device 100, the one that faces the outside of the tape player 310 so that the cell 150 may still receive the natural light when inserted in the tape player 310. The battery 120 may thus be charged when the device 100 is in use and inserted in the tape player 310. The device 100 further comprises a charge indicator indicating a state of charge of the battery 120. When the indicator 170 indicates a low charge of the battery 120, the tray 140 may be opened to recharge the battery 120. FIG. 5 shows another embodiment where the battery is recharged using a cigarette-lighter connector 160 such as the ones commonly available.

It is also to be noted that the apparatus 200 is not necessarily a cell-phone as described previously. The invention also encompasses other Bluetooth devices, e.g. PDAs, MP3 players, pager, for which a received audio or text data signal will be forwarded to the device 100 and rendered by the tape player 310 or ancillary devices coupled to it when the device 100 is inserted in the tape player 310.

It is within the scope of the invention to consider alternative embodiments where the device 100 is inserted in the tape player 310 before any call is received on the phone 200. Thus, for example once a call that was rendered using the device 100 of the invention is terminated, the user may leave the device 100 in the tape player 310. In such case, a future incoming call received on the cell phone 200 will automatically be accepted by the device 100 of the invention and rendered through the device 100 unless specified otherwise by the user. Indeed, a user may interrupt or inactivate the automatic forwarding of phone calls to the device 100 by ejecting the device 100 from the tape player 310 or by inactivating the device 100. The user may also accept the call through the cell-phone itself by pressing a "call accepting" button on the cell-phone 200.

It is also within the scope of the invention to consider an embodiment where several Bluetooth cell-phones or other Bluetooth-enabled consumer electronic devices, such as a PDA or an MP3 player, are within the receiving range of the Bluetooth module 130. In such embodiment, any incoming audio data received by one of such devices will be rendered through the device 100 when inserted in a tape player according to a method of the invention.

What is claimed is:

1. A device for insertion in a tape player, the device comprising:

a Bluetooth module configured to automatically detect a presence of a Bluetooth-enabled apparatus in a receiving range of the device, to automatically detect a data communication initiated with the portable apparatus over a wireless network when the device is inserted in the tape player, for automatically configuring the apparatus to transmit to the device a low frequency signal representative of the communicated data and the Bluetooth module is further configured to receive the low frequency signal;

a circuit arrangement for converting the received low frequency signal into a magnetic signal; and, a transducer for communicating the magnetic signal to the tape player.

2. The device of claim 1, wherein the communicated data comprises audio data and the low frequency signal is representative of the audio data, and the transducer further communicates the magnetic signal to a magnetic head of the tape player for play out by a sound system coupled to the tape player.

3. The device of claim 2, wherein the Bluetooth enabled apparatus comprises a cell-phone and the communicated data represents a phone call to the apparatus.

4. The device of claim 2, wherein the Bluetooth enabled apparatus comprises a cell-phone and the communicated data represents a notification of a new voice mail delivered to a mailbox associated with the apparatus.

5. The device of claim 1, wherein the device has a shape substantially equivalent to the shape of a magnetic cassette.

6. The device of claim 1, wherein the communicated data comprises text data.

7. The device of claim 6, wherein the apparatus comprises a text to speech software application that converts the text data in an audio file, the low frequency signal comprises the audio file and the transducer further communicates the magnetic signal to a magnetic head of the tape player for play out by a sound system coupled to the tape player.

8. The device of claim 6, wherein the low frequency signal comprises identification data identifying an addresser of the text data to the apparatus and the transducer further communicates the magnetic signal to a magnetic head of the tape player for display onto a display associated with the tape player.

9. The device of claim 1, wherein the device is solar-powered.

10. The device of claim 1, further comprising:

a source of power rechargeable from a power source of the tape player when inserted in the tape player.

11. The device of claim 1, further comprising:

a source of power rechargeable from a cigarette-lighter power source in a car.

12. A system comprising:

a portable Bluetooth-enabled apparatus for transmitting a radio frequency audio signal;

a device for insertion in a tape player, the device comprising a Bluetooth module configured to automatically detect a presence of the apparatus in a receiving range of the device, to automatically detect a data communication initiated with the portable apparatus over a wireless network when the device is inserted in the tape player, for automatically configuring the apparatus to transmit to the device a low frequency signal representative of the communicated data and the Bluetooth module is further configured to receive the low frequency signal;

a circuit arrangement for converting the received low frequency signal into a magnetic signal; and, a transducer for communicating the magnetic signal to the tape player.

* * * * *